United States Patent
Choi et al.

(10) Patent No.: US 7,093,264 B2
(45) Date of Patent: Aug. 15, 2006

(54) METHOD AND APPARATUS FOR ASSEMBLING ENTERPRISE JAVABEANS COMPONENTS

(75) Inventors: You-Hee Choi, Daejeon (KR); Seung-Youn Lee, Daejeon (KR); Oh-Cheon Kwon, Daejeon (KR); Gyu-Sang Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 634 days.

(21) Appl. No.: 10/133,496

(22) Filed: Apr. 29, 2002

(65) Prior Publication Data

US 2003/0122867 A1  Jul. 3, 2003

(30) Foreign Application Priority Data

Dec. 28, 2001  (KR)  ................................ 2001-86928

(51) Int. Cl.
*G06F 9/00* (2006.01)
(52) U.S. Cl. ..................................................... 719/316
(58) Field of Classification Search ................ 719/310, 719/316; 717/107
See application file for complete search history.

(56) References Cited

U.S. PATENT DOCUMENTS

| | | | |
|---|---|---|---|
| 5,850,548 A * | 12/1998 | Williams | 717/107 |
| 5,991,535 A | 11/1999 | Fowlow et al. | |
| 6,226,692 B1 | 5/2001 | Miloushev et al. | |
| 6,587,556 B1 * | 7/2003 | Judkins et al. | 379/219 |

OTHER PUBLICATIONS

Rosenblum, Supporting architectural connerns in component interoperability standards, Jun. 6, 2000.*

* cited by examiner

*Primary Examiner*—William Thomson
*Assistant Examiner*—LeChi Truong
(74) *Attorney, Agent, or Firm*—Mayer, Brown, Rowe and Maw LLP

(57) ABSTRACT

An apparatus for assembling EJB components is provided. The apparatus includes a composite palette for browsing and managing the EJB components, and an architecture diagram editor module for dragging and dropping the EJB components shown in the composite palette or new component and connector icons to visually generate the architecture based on the C2 style. The apparatus further includes a component property editor module for describing properties and specifications of the EJB components in an architecture, and a glue code and composite EJB generator module for generating composite EJB component code and related glue code.

15 Claims, 7 Drawing Sheets

METHOD AND APPARATUS FOR ASSEMBLING ENTERPRISE JAVABEANS COMPONENTS

FIELD OF THE INVENTION

The present invention relates to a method and an apparatus for developing component-based software; and, more particularly, to a method and an apparatus for assembling Enterprise JavaBeans (EJB) components to generate a composite EJB component using an architecture built through visually assembling prebuilt EJB components with a plug-and-play style.

BACKGROUND OF THE INVENTION

In the field of Component-Based Software Engineering (CBSE), the term 'system development' implies to assemble existing software components rather than to create a new system from scratch. Various efforts have been made to develop component models such as EJB, DCOM/COM+ and CCM for facilitating the reuse of existing components, and to develop an Enterprise Application Integration (EAI) technique in order to support an infrastructure for the integration of heterogeneous legacy applications.

As a component model of a server side, EJB was developed with the intention to reuse existing EJB components on various platforms without a code modification and a re-compiling process.

However, it is very difficult to assemble various EJB components provided by third-parties using a plug-and-play style for the following reasons. Firstly, since a component model has a wide variety of vendor specific methods for implementing an infrastructure or middleware, it is difficult to assemble the components generated based on different infrastructures or middleware with the plug-and-play style. Secondly, since a direct invocation of a method is required for interactions between EJB components provided by third parties, the method of a component should be invoked at a client level where the component is reused.

In order to solve the first problem stated above in assembling the EJB components, the Enterprise Application Integration (EAI) technique has been suggested. The EAI technique intends to integrate legacy systems into an enterprise system. However, since the system integration techniques developed by various vendors are different from each other, systems cannot be integrated unless the integration technique of a single vendor is employed. In other words, the component models and enterprise integration techniques suggested so far for the purpose of allowing the various components to be assembled and reused regardless of implementations of the components, have a critical defect in that they are dependent upon the vendors that develop the infrastructure and middleware for supporting the models. Unless EJB vendors keep standards of EJB specifications, this problem cannot be solved. In addition, the plug-and-play assembly of the EJB components, and the flexible reconfiguration of a system model built by the assembly process, are very difficult since methods have to be directly invoked for the interactions between the EJB components. In order to solve the second problem, a component assembly method capable of visually assembling and flexibly reconstructing the EJB components.

There has been suggested an architecture-based assembly process where the existing EJB components are assembled to form a high-level architecture. A well-defined architecture for a target system indicates how the system is organized and functions at a high-level. Services that will be provided by the assembled system can be abstractly expressed. Further, the well-defined architecture can be used to analyze, refine, test and add functions of the software system to be developed. Accordingly, if the EJB components are assembled based on the architecture, the EJB components can be exactly connected and operated through the modeling, analyzing and refining process of the architecture. In addition, the architecture can be used as a large-grained component which performs larger functions, and be also used as a unit application system with a client program.

An architecture based approach of generating a well-defined system by analyzing a target system at a higher level has not been much used for building a software system through assembling the existing EJB components in large-scale business. Though previous research work described in D. S. Rosenblum and R. Natarajan, "Supporting architectural concerns in component interoperability standards," IEEE Processings: Software, Vol 147, No. 6, pp 215 to 223, has attempted to create the architecture based software, the 'ARABICA' developed therein as an architecture modeling tool capable of assembling JavaBeans components has a limit in that the JavaBeans component model is not a server-side model but a client side model for reuse of Graphic User Interface (GUI) components.

The assembly of GUI components is less useful than the assembly of server-side components used in business domains. Further, the editing process supported by the ARABICA cannot provide users with the plug-and-play assembly for the server-side EJB components.

Further, since the ARABICA does not generate implementation code, though it builds the model of a system architecture composed of JavaBeans components, the system architecture cannot be reused as a new component.

As a result, a plug-and-play assembly technique of server-side EJB components frequently used in the business environment is required. The generation of composite EJB is also required for reuse of the assembled EJB components.

SUMMARY OF THE INVENTION

It is, therefore, an objective of the present invention to provide a method and an apparatus capable of visually assembling Enterprise JavaBeans (EJB) components by a plug-and-play style based on the C2 style, generating a composite EJB as a new EJB component in order to reuse the assembled EJB components, and performing the composite EJB as a unit application with a client program.

In accordance with one aspect of the present invention, there is provided an apparatus for assembling EJB components by the plug-and-play technique, comprising:

a composite palette for browsing and managing the EJB components;

an architecture diagram editor module for dragging and dropping the EJB components shown in the composite palette or using the component and connector icons in order to visually build an architecture for a composite component according to the C2 style;

a component property editor module for setting the properties of EJB components in an architecture, and describing a component specification which has information about interfaces and behaviors of each EJB component; and a glue code and composite EJB generator module for automatically generating composite EJB component code and glue code.

In accordance with another aspect of the present invention, there is provided a method for assembling EJB components, comprising the steps of:

generating a new architecture diagram;

dragging an EJB jar from a composite palette and dropping the EJB jar to an architecture diagram editor;

editing the architecture diagram;

editing property and specification information of each component;

generating an EJB wrapper file for each EJB component using the edited property and specification information; and generating a composite EJB for the architecture.

This invention allows users to flexibly assemble the EJB components without an additional implementation process with the plug-and-play technique. Also, it enables a composite EJB which is generated automatically to be performed as a unit application with a client program.

BRIEF DESCRIPTION OF THE DRAWINGS

The objectives and features of the invention will become apparent from the following description of preferred embodiments given in conjunction with the accompanying drawings, in which.

DETAILED DESCRIPTION OF PREFERRED EMBODIMENTS

Figure 1:
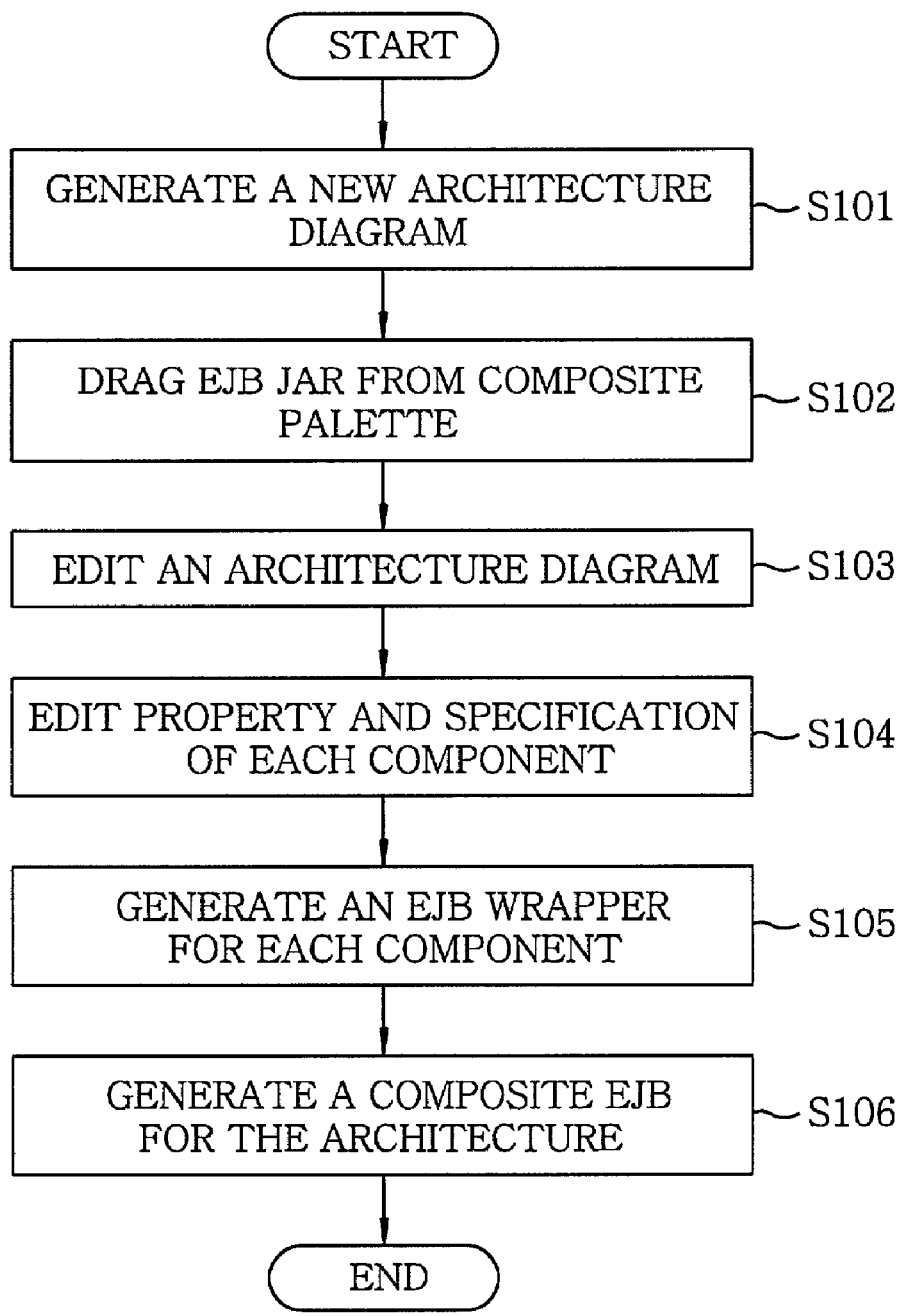
FIG. 1 shows a flow chart for describing the process of assembling EJB components in accordance with a preferred embodiment of the present invention.

Referring to FIG. 1, there is provided a flow chart of a system operation in accordance with the present invention.

Firstly, an architecture modeling process is performed. A new architecture diagram is generated (step S101) and an EJB jar for composing an architecture is dragged and dropped from a composite palette (step S102). Thereafter, interactions of the components are considered to place connectors between the components and, then, links are established between the components and connectors, or between the connectors themselves (step S103).

Next, a component specification is created for defining interfaces of each component and the interactions between the components (step S104). During this process, a component specification editor of a wizard type provides a user with interaction information between components, EJB component information and so on, thereby allowing an easy creation of the specification.

Thereafter, an EJB wrapper file, a glue code for converting EJB components to the C2 components, is automatically generated for each component by using the specification information (step S105).

If the component specifications and the EJB wrapper files are all generated for the components incorporated in the architecture, the architecture modeling process is completed. Then, a composite EJB is created to be used for a unit application with a client program, and be reused as a new component. In order to create the composite EJB, the user only has to define interface information for creating the composite EJB by using a graphic user interface. Then, a home/remote interface, a session bean and a session bean glue code file of a composite EJB are automatically generated (step S106).

Figure 2:
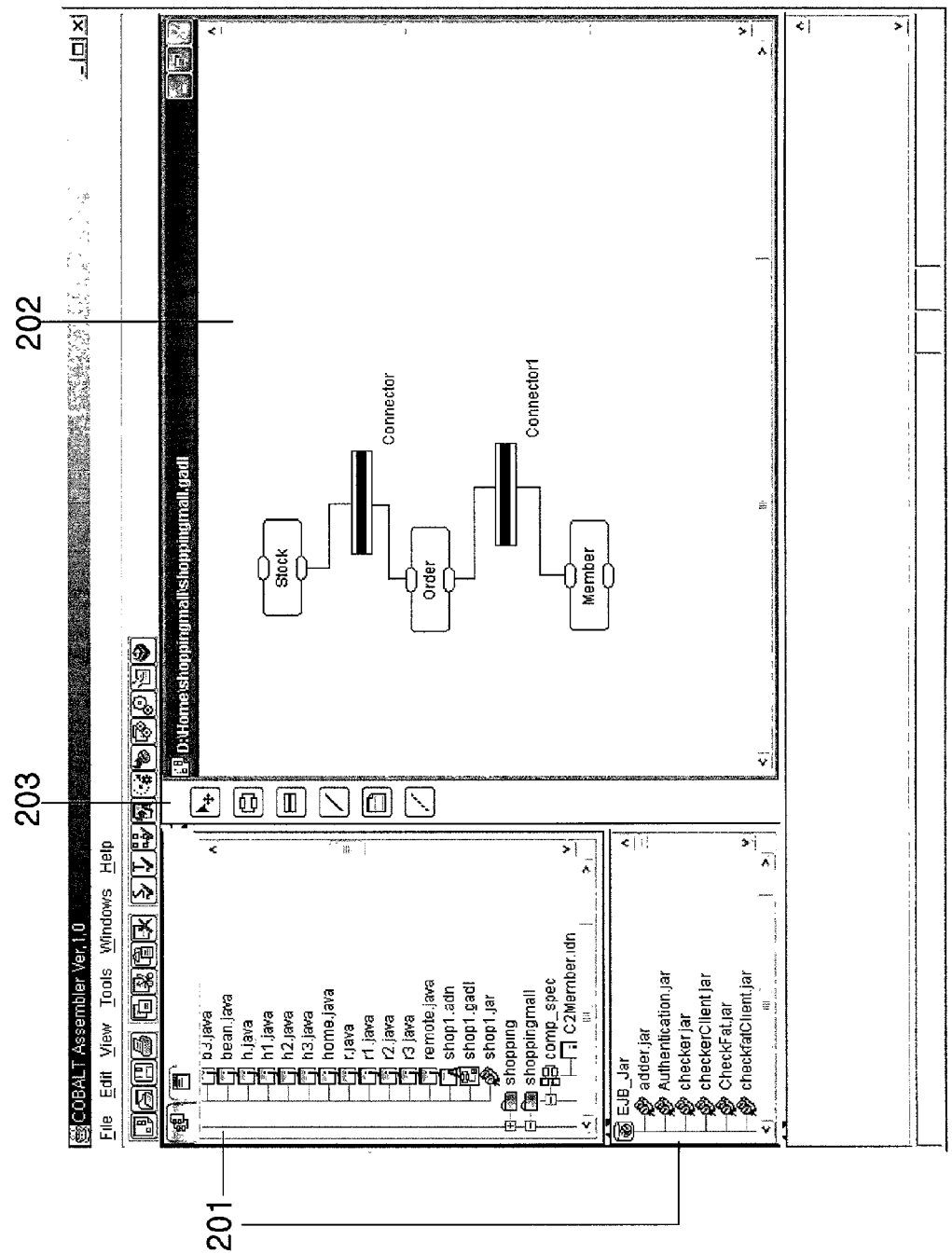
FIG. 2 depicts windows for visually modeling an architecture to assemble EJB components in accordance with the present invention.

Referring to FIG. 2, there is illustrated a window for assembling EJB components.

In particular, FIG. 2 shows a window for visually modeling the architecture. The window includes a composite palette 201, an architecture diagram editor 202 and a diagram palette 203.

The composite palette 201 browses EJB components (EJB Jars) to be assembled, a visually modeled architecture model file, a component specification file and an EJB wrapper file serving as a glue code for converting EJB components to the C2 components, which allow them to be used for modeling the architecture in the architecture diagram editor 202.

The architecture diagram editor 202 allows the visual modeling of the architecture according to the C2 style. The user selects a desired EJB component from an EJB-Jar directory of the composite palette 201 where the EJB components are stored, and drags and drops the selected EJB component to the architecture diagram editor 202. As a result, an architecture composed of several EJB components is built.

A connector is selected from the diagram palette 203, which is used to draw the architecture, and is dragged and dropped to the architecture diagram. Then, the components and the connectors are connected with links so that the architecture can be completed.

The architecture diagram editor 202 also checks whether or not the assembled architecture contains any syntactical errors, grammatical errors and topology errors against the C2 style.

Figure 3:
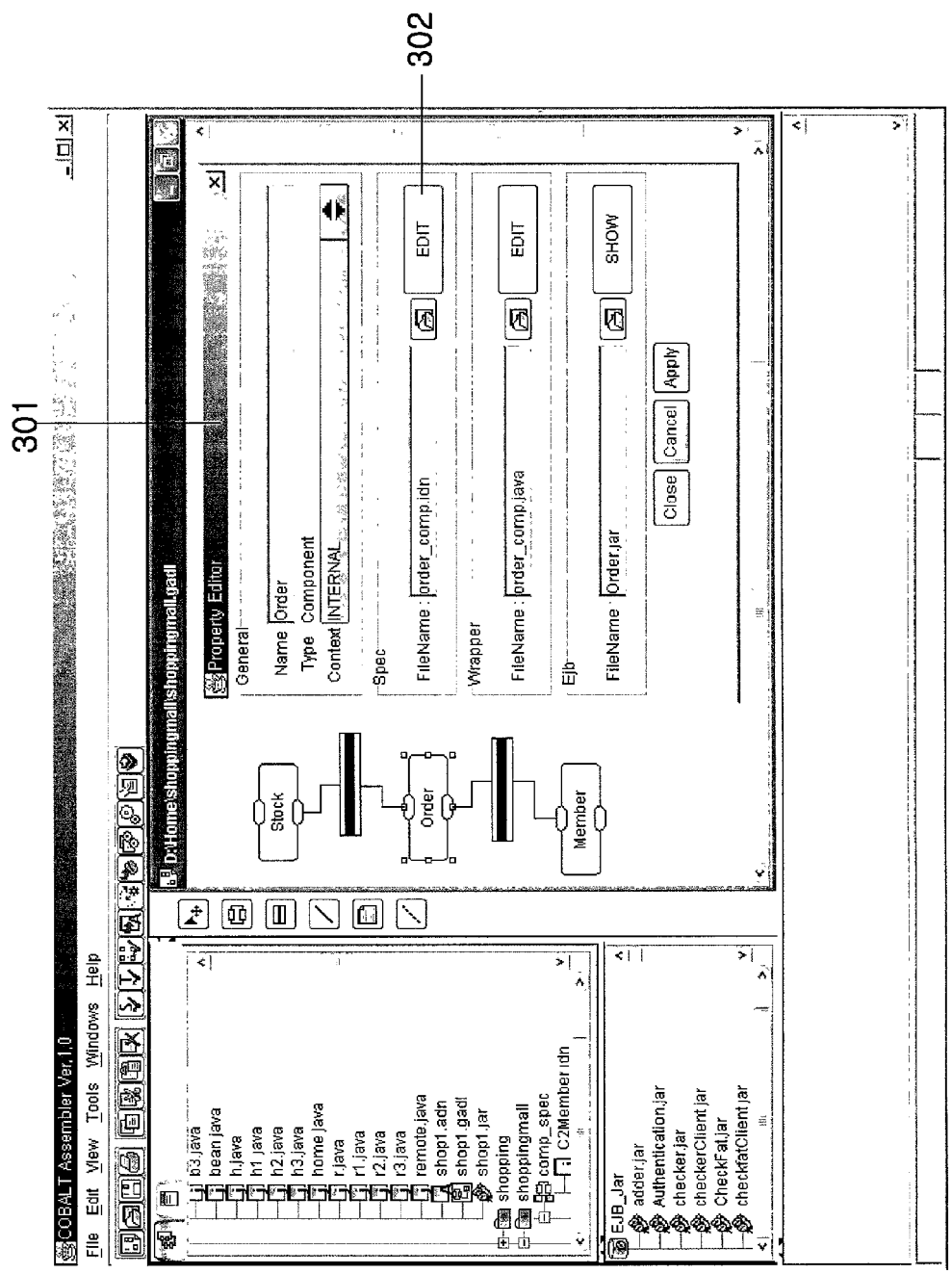
FIG. 3 illustrates windows for editing the properties of the components of an architecture.

Referring to FIG. 3, there is described a property editor 301 for editing properties of the components in an architecture.

As shown in FIG. 3, the property editor 301 is used to set a component name in the architecture and component context information for indicating a hierarchy of the component in the architecture.

Further, by using the property editor 301, link information on the component specification file which includes the specification information for describing interfaces and behaviors of the components, link information on the EJB wrapper file which functions as the glue code for converting EJB components to the C2 components based on the specification information, and information on EJB package (Jar) for each component can be stored in and obtained from model information of the architecture diagram editor 202.

If a user clicks on an 'Edit' button 302, the specification editors of wizard type 401, 402, 501 and 502 with linked specification files are opened so that each specification file can be edited.

Figure 4:
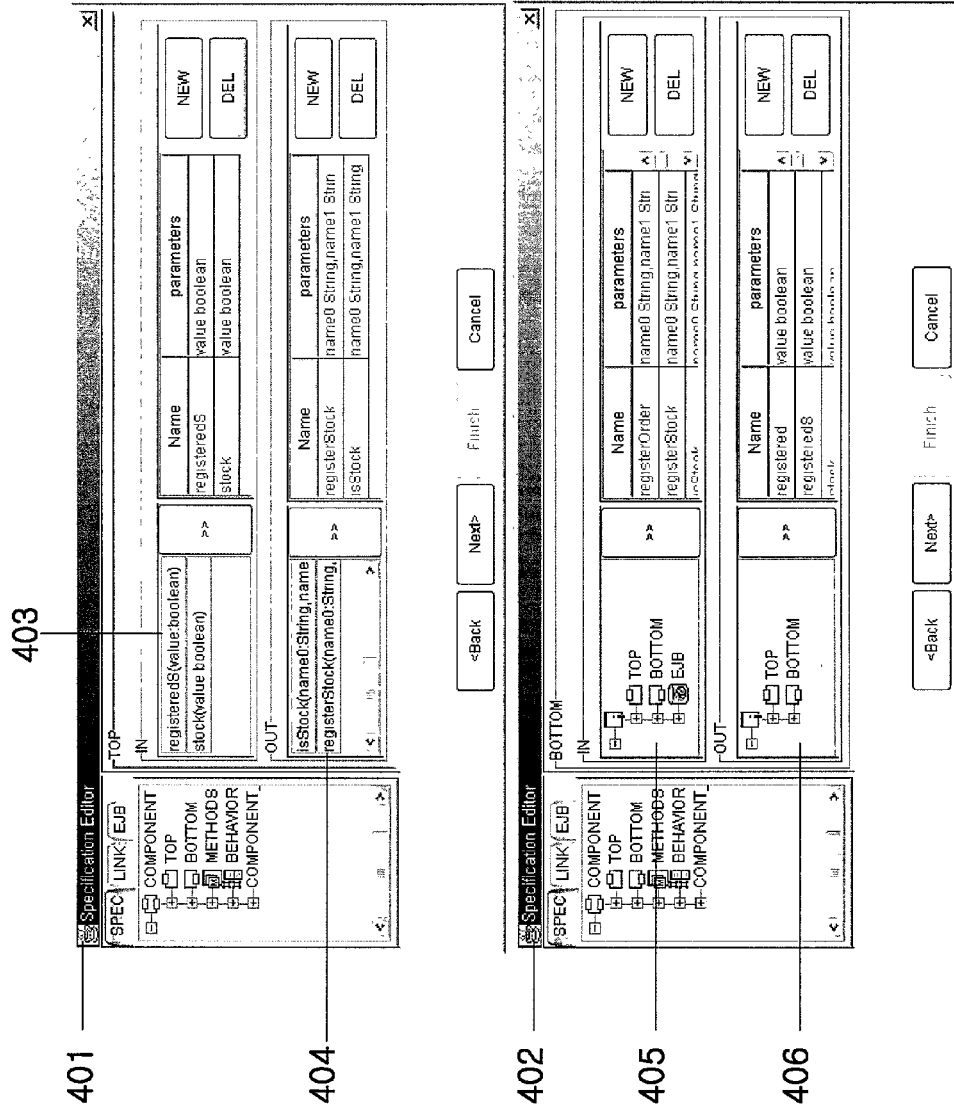
FIG. 4 describes windows for generating a 'Top/Bottom' interface specification of each component.
Figure 5:
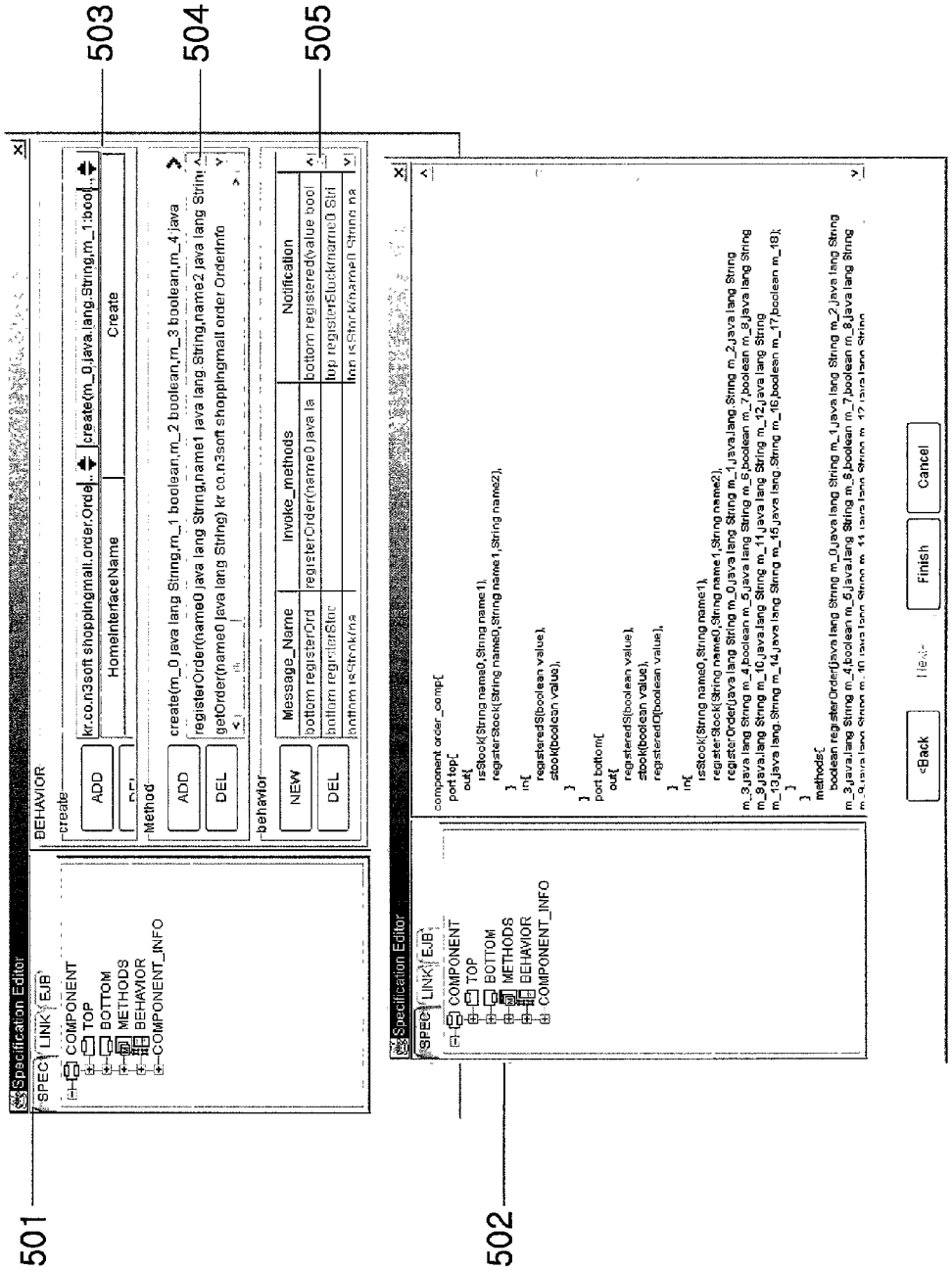
FIG. 5 shows windows for showing a specification editing screen of specifying methods and behaviors of the component, and a screen of a specification file to be generated.

FIGS. 4 and 5 show the specification editors of wizard type 401, 402, 501 and 502 for generating the component specification that describes the interface and behavior of each component.

The specification editor 401 allows the user to specify a 'Top' interface, which is one of two ('Top' and 'Bottom') interfaces of a component in the C2 style.

The 'Top' interface of a chosen component is used to deliver a Request message to a higher level component connected to the component or receive a Notification message from the higher level component.

In other words, the 'Top' interface is composed of messages delivered to or received from 'Bottom' interfaces of the higher level components connected to the chosen component.

To facilitate the specification editing process based on the above described principle, the reference numbers 403 and 404 show 'Bottom' interface information of the higher level components. The user only has to select a desired message and clicks on '>>' button in order to easily specify the 'Top' interface of the chosen component.

In particular, the reference number 403 provides a message list that can be received by the 'Top' interface of the chosen component, i.e., a Notification message list transmitted from the 'Bottom' interfaces of the higher level components linked to the chosen component. Likewise, the reference number 404 shows a message list that can be sent from the 'Top' interface of the chosen component to the higher level components, i.e., a Request message list that can be received by the 'Bottom' interfaces of the higher level components linked to the chosen component.

In addition, the specification editor 402 is a window for specifying a 'Bottom' interface of the chosen component. The 'Bottom' interface of the chosen component is used to receive a Request message from a lower level component linked to the chosen component or deliver a Notification message to the lower level component.

In other words, the 'Bottom' interface is composed of messages delivered to or received from 'Top' interfaces of the lower level components connected to the chosen component.

Accordingly, the Request message that can be defined in the 'Bottom' interface of the chosen component is transmitted from the lower level component. The Request message can be processed by the chosen component or delivered to the higher level component.

To facilitate the specification editing process based on the above-described principle, the reference number 405 shows a list of Request messages transferred from the lower level component in a 'Bottom' folder, and a list of methods that the related EJB component contains in an 'EJB' folder, since the message that can be processed by the chosen component is a Request message for invoking the methods that the chosen component includes.

Further, the messages to be delivered to the higher level components are listed in a 'Top' folder of the reference number 405. The user only has to select a desired message or method and click on the button '>>' to define the 'Bottom' interface, as in the case of defining the 'Top' interface.

The Notification message that can be defined in the 'Bottom' interface of the chosen component is received by the 'TOP' interface of the lower level component. The Notification message can be the result processed by the chosen component or be received from the higher level component.

According to the above principle, the reference number 406 shows a list of the Notification messages that can be received by the 'TOP' interfaces of the lower level components in a 'Bottom' folder, and a list of the Notification messages that are defined in the 'Bottom' interfaces of the higher level components in a 'Top' folder. The message of the result processed by the chosen component represents the result of method invocations of the related EJB component. Since such a result is not a kind of message, the user can edit the message name as desired.

Referring to FIG. 5, there are provided windows for inputting a specification of method and behavior information on a component, and displaying information on a specification file to be generated.

A specification editor 501 is a window for inputting a specification of method and behavior information on the component. The reference number 503 provides a list of "create( )" methods for each bean since an EJB component can be a package (jar) unit in which several EJB beans are packaged and the "create( )" method can be defined in several different ways. The user may select a "create( )" method.

The reference number 504 allows the user to select methods to be processed by the EJB component in the architecture.

The reference number 505 allows the user to input the behavior information of the component. In more detail, the method invoked after the message is received from the 'Top/Bottom' interfaces of chosen the component, and the message information generated and delivered through 'TOP/Bottom' interfaces can be inputted. Since each information may be seen as a list of previously inputted information on each table cell, behavior information may be inputted without an editing operation.

The specification editor 502 is a window for showing the user the specification information inputted through the specification editors 401, 402 and 501 before generating a text file from the inputted specification information.

Figure 6:
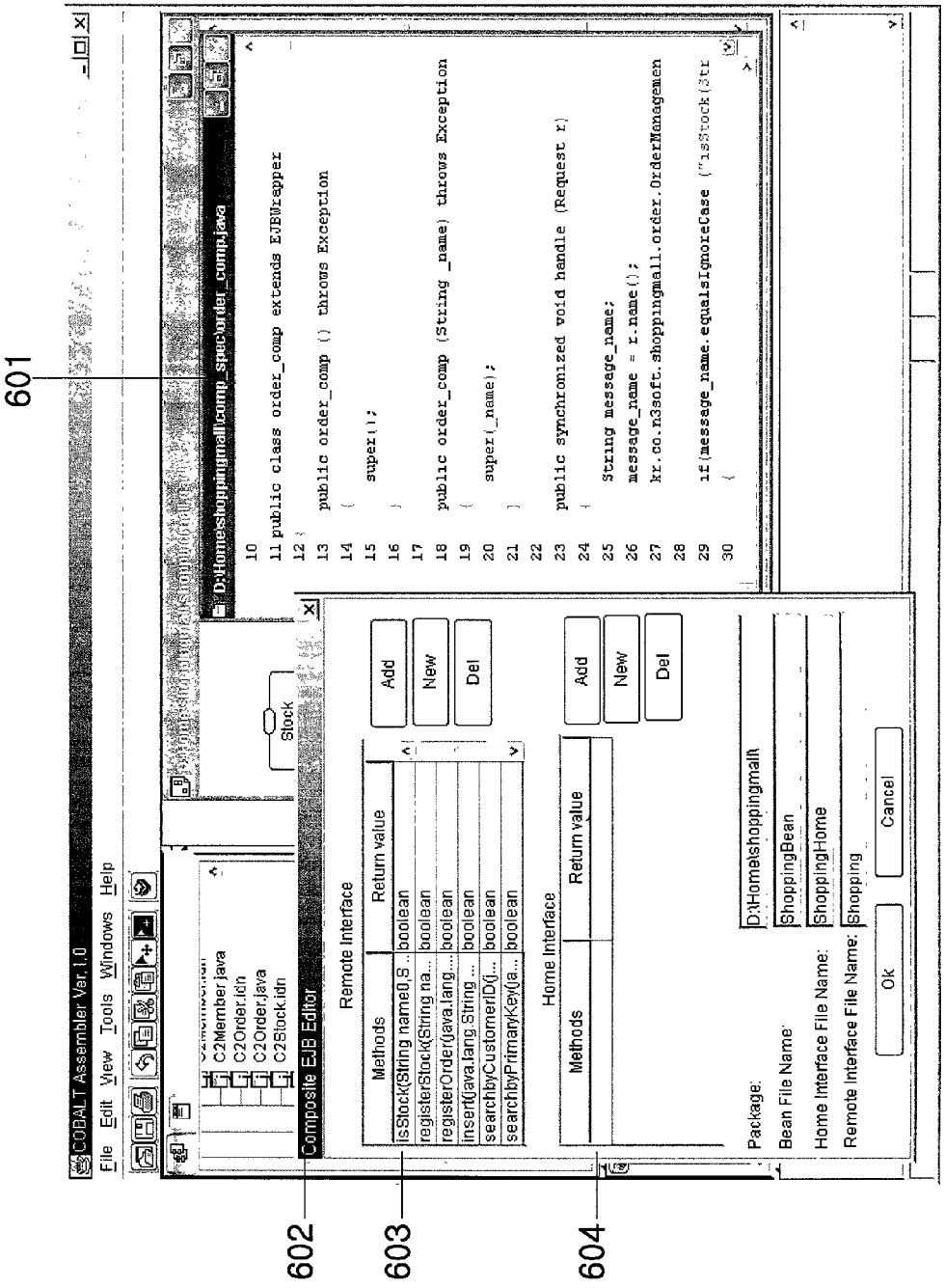
FIG. 6 sets forth windows for showing an EJB wrapper file and a composite EJB interface editor.

Referring to FIG. 6, there are provided a code editor 601 for displaying an EJB wrapper file automatically generated based on the specification information created by the specification editors 401, 402, 501 and 502, and a composite EJB interface editor 602 for defining a home/remote interface of a composite EJB and setting the names of files to generate a composite EJB for the whole architecture.

The EJB wrapper file 601 is a glue code for converting EJB components to the C2 components in the architecture. The EJB wrapper file 601 converts the EJB component to the C2 component based on the behavior information of the chosen component produced by the specification editors 401, 402, 501 and 502.

The EJB wrapper contains the logics of processing messages of each EJB component, and searching for home/remote interfaces according to an application server. The message processing logic of the EJB wrapper can have various forms depending on the hierarchy and role of the EJB components in the architecture when the Notification message is received from the 'Top' interface or the Request message is received from the 'Bottom' interface. The EJB wrapper receives the message to invoke the EJB method, transfers the result to the "Top" or "Bottom" interface in a message format or transfers the received message to the other component. Accordingly, the Request/Notification processing logics of the EJB wrapper can be implemented in various ways depending on not only the functions of each EJB component but also the functions of the components that exist in lower and higher levels. If an EJB method of the higher level component in the architecture is required at a time when the EJB components are assembled, the EJB method of the higher level component is defined as the Request message of the 'Top' interface, and a message of the result is defined as the Notification message. If an EJB method of the lower level component in the architecture is required, the EJB method of the lower level component is defined as the Notification message of the 'Bottom' interface, and a message of the result is defined as the Request message.

The Request processing logics of the EJB wrapper include logics for processing Request messages from the lower level components, i.e., the Request messages defined in the 'Bottom' interface. If the Request message received from the lower level component is a message that requires the function of a higher level component, the Request message is processed to have a format adequate for the higher level component before delivered. The Request messages delivered to and the Notification messages received from the higher level components are defined as the Request message and the Notification message, respectively, of the 'Top' interface of the chosen component.

If the Request message from the lower level component requires the function of the related EJB component of the chosen component, the EJB wrapper invokes the method of the EJB component, generates a notification message, and transfers the result to the lower level component. It can also generate a Request message and transfer the message to the higher level component. In this case, the Notification message for the lower level component and the Request message for the higher level component are defined as the Notification message of the 'Bottom' interface and the Request message of the 'Top' interface, respectively, of the chosen component.

The Notification processing logics of the EJB wrapper include logics for processing the Notification messages received from the higher level components, i.e., the Notification messages defined in the 'Top' interface.

The Notification processing logics of the EJB wrapper also include a logic for invoking a method of a related EJB component by using the result of the Notification message received from the higher level component, and either generating a Notification message to be transferred to the lower level component or generating a Request message to be delivered to the higher level component. In this case, the generated Notification message and the generated Request message are defined as the Notification message of the 'Bottom' interface and the Request message of the 'Top' interface, respectively.

By using this mechanism described above, a new message can be additionally defined regardless of the home/remote interface of the EJB bean.

A logic for searching for the home/remote interface of each EJB bean from a viewpoint of the EJB client is required so as to use the methods of the EJB component. A series of EJB connection points such as those for searching the home interface of the EJB bean may be differently implemented depending on the application server in which each EJB component is deployed.

As a result, independent EJB components are assembled in the C2 architecture based on the EJB wrappers so that the independent functions of each EJB component can be easily assembled.

The composite EJB interface editor 602 is a window for defining the home/remote interface of a composite EJB to produce a composite EJB that is a new EJB component based on the architecture generated by assembling several EJB components, and specifying the names of home/remote interfaces for the composite EJB and the name of a bean file. If the user clicks on the 'OK' button, the composite EJB interface file, the bean file and a bean glue code which connects the composite EJB to the architecture, are automatically generated.

The composite EJB is generated to allow the architecture composed of several EJB components to be used as a single EJB component. The generation of the composite EJB is the process of building an EJB component which uses Request messages defined in the 'Bottom' interface of a bottommost component of the architecture in terms of the C2 style. With this technical concept, a composite EJB, a stateless session bean, is generated, which is connected to the bottommost component of the architecture composed of several EJB components in order to use the function of the whole architecture. The home/remote interface of the composite EJB may be composed of new methods that are generated by various combinations of Request messages and Notification messages of the 'Bottom' interface of the bottommost component.

A mediator is required in order to connect the composite EJB to the C2 architecture. This mediator is distinguished from the EJB wrapper which is employed to assemble the EJB components in the C2 architecture. Since the mediator connects the C2 architecture to a session bean of the composite EJB, it can be called the glue code for a session bean. The glue code for a session bean enables connections between components and connectors by using topology information of the C2 architecture; generates a Request message corresponding to a method defined in a remote interface of the session bean; receives a Notification message; and returns the result of the Notification message.

The reference number 603 is a table for setting methods to be defined in the remote interface of the composite EJB. The Request message information defined in the 'Bottom' interface of the bottommost component of the architecture is shown as methods information for defining the remote interface of the composite EJB. By using the table 603, the user can select a desired message to specify the parameter information and method name of the remote interface.

Based on the Request message information selected by the user, the parameter type information on a final Notification message of the corresponding Request message is listed on the 'Return value' column so that the user can choose the desired parameter type.

The reference number 604 is a table for allowing the user to define the home interface of the composite EJB as in the remote interface. Accordingly, the files related to the composite EJB are automatically generated so that the composite EJB can be much more reused and the development time of a new EJB component can be reduced.

Figure 7:
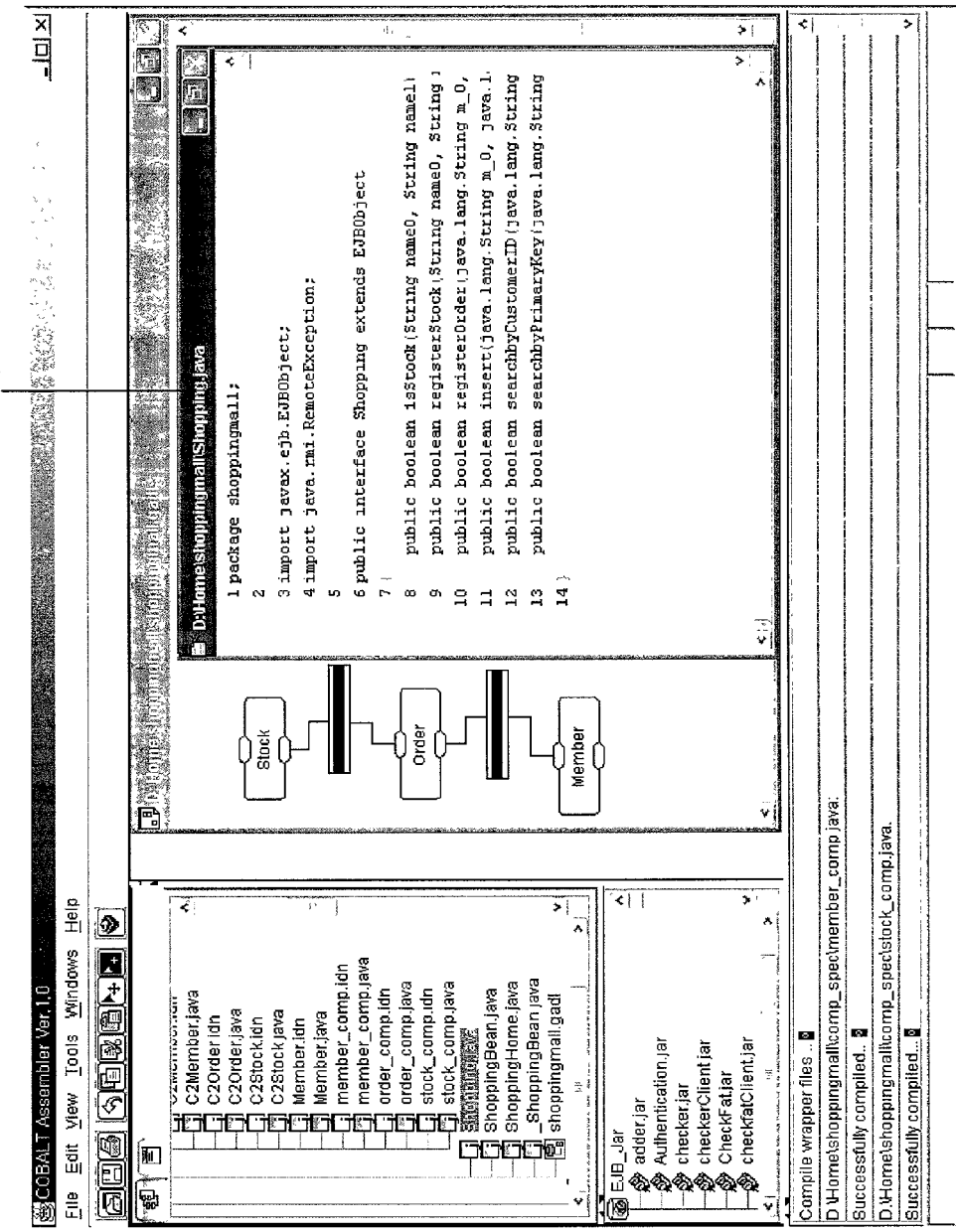
FIG. 7 is a window for explaining the remote interface of the composite EJB generated automatically.

Referring to FIG. 7, there is provided a window that shows the remote interface file of composite EJB in a code editor 701, which is automatically generated using the information edited by the composite EJB interface editor 602.

As described above, the present invention provides a method and a system for building an architecture by visually and flexibly assembling several EJB components, automatically generating a composite EJB component, i.e., a new reusable EJB component for the architecture without a complicated implementation process, and enabling the composite EJB component to be run as a unit application with a client program.

As described above, the present invention provides a system where the EJB components are visually assembled according to the C2 style to build an architecture, and the EJB components can be modeled based on the architecture. Since information on how the system is organized and functions at a high-level is specified, the services that will be provided by the assembled system can be abstractly expressed. Further, by automatically generating a specification file of each EJB component, which is expressed in an Architecture Description Language (ADL) of the C2 style, architecture modeling of the components can be made correctly and completely, and elements of the organized model can be exactly mapped to existing EJB components so that their relationships can be continuously maintained. Thus, by describing the structure of the composite EJB and the behaviors of components through an architecture modeling process at the higher abstract level, the EJB components developed by third parties can be assembled by plug-and-play style. Further, by using the specification editor that provides graphic user interfaces of the wizard type, a specification for each EJB component of the architecture can be readily generated without a complicated text editing process even though the user does not know an ADL. Further, by automatically producing the EJB wrappers using the generated specification information, various EJB components can be effectively assembled. Accordingly, an addition, deletion and replacement of a component can be readily made in the existing architecture for the purpose of extension and maintenance of the architecture. Still further, by automatically generating a composite EJB for the architecture composed of several EJB components, the architecture of a composite EJB can be reused as a new EJB component and is used as a unit application with a client program. Consequently, the present invention facilitates reuse of existing EJB components through plug-and-play assembly and reduces the development time of a new EJB component and a new application.

While the invention has been shown and described with respect to the preferred embodiments, it will be understood by those skilled in the art that various changes and modifications may be made without departing form the spirit and scope of the invention as defined in the following claims.

What is claimed is:

1. An apparatus for assembling EJB (Enterprise Java-Beans) components, comprising:
    a composite palette for browsing and managing the EJB components;
    an architecture diagram editor module for dragging and dropping the EJB components shown in the composite palette or using the component and connector icons in order to visually build an architecture for a composite component according to the C2 (chiron-2) style;
    a component property editor module for setting the properties of EJB components in an architecture, and describing a component specification which has information about interfaces and behaviors of each EJB component;
    a glue code and composite EJB generator module for automatically generating composite EJB component code and glue code;
    wherein the component property editor module includes:
    a property editor module for setting and showing a name of the component and component context information describing hierarchy information of the component in the architecture, link information on a component specification file which specifies interfaces and behaviors of the component with an Architecture Description Language, link information on an EJB wrapper file which is used as a glue code for converting the EJB components to C2 components based on the component specification information, and EJB package (Jar) information of the component; and
    a specification editor module of the wizard type for being used to generate a specification file for describing interfaces and behaviors of the EJB components in the architecture.

2. The apparatus of claim 1 wherein the specification editor module generates the specification file for describing interfaces and behaviors of each component if 'Top'/'Bottom' interface, method and behavior information of each component are inputted by a wizard.

3. The apparatus of claim 1, wherein the composite palette browses and manages the EJB components (EJB packages) provided by a third party or in-house developed, architecture model files which are visually modeled, component specification files, and EJB wrapper files used as glue codes for converting the EJB components to C2 components, enabling the modeling of the architecture in the architecture diagram editor.

4. The apparatus of claim 1, wherein the architecture diagram editor module enables to assemble visually components into the architecture based on the C2 style by dragging-and-dropping the components selected from the composite palette, and check whether or not a syntax, a semantic and a topology of the architecture conform to the C2 style.

5. An apparatus for assembling EJB (Enterprise Java-Beans) components, comprising:
    a composite palette for browsing and managing the EJB components;
    an architecture diagram editor module for dragging and dropping the EJB components shown in the composite palette or using the component and connector icons in order to visually build an architecture for a composite component according to the C2 (chiron-2) style;
    a component property editor module for setting the properties of EJB components in an architecture, and describing a component specification which has information about interfaces and behaviors of each EJB component;
    a glue code and composite EJB generator module for automatically generating composite EJB component code and glue code;
    wherein the glue code and composite EJB generator module includes:
    a glue code generator module for extracting the behavior information of the component from specification information built by an Architecture Description Language based on the C2 style and, then, automatically generating an EJB wrapper file that is used as a glue code for converting the EJB components to C2 components in the architecture based on the extracted behavior information; and
    a composite EJB generator module for defining a home/remote interface of a composite EJB, designating the name of a new file by using a composite EJB interface editor module, and then automatically generating the home/remote interface, a session bean file and a bean glue code file of the composite EJB.

6. The apparatus of claim 5, wherein the glue code generator module automatically generates the EJB wrapper file that is used as the glue code for converting the EJB components to C2 components in the architecture using the interface and behavior information of the component made by the specification editor, wherein said EJB wrapper file has a Request/Notification message processing logic for each component and a home/remote interface searching logic according to an application server to be used.

7. The apparatus of claim 5, wherein the composite EJB generator module includes:
- a composite EJB interface editor module for generating the composite EJB for the whole architecture by providing a list of specification information on a bottom-most component of the architecture in order to define the home/remote interface of the composite EJB, and for allowing the user to specify the file name to be generated; and
- a composite EJB code generator module for creating the home/remote interface of the composite EJB, the session bean file, and a glue code file of a session bean for connecting the composite EJB to the architecture.

8. The apparatus of claim 5, wherein the composite palette browses and manages the EJB components (EJB packages) provided by a third party or in-house developed, architecture model files which are visually modeled, component specification files, and EJB wrapper files used as glue codes for converting the EJB components to C2 components, enabling the modeling of the architecture in the architecture diagram editor.

9. The apparatus of claim 5, wherein the architecture diagram editor module enables to assemble visually components into the architecture based on the C2 style by dragging-and-dropping the components selected from the composite palette, and check whether or not a syntax, a semantic and a topology of the architecture conform to the C2 style.

10. An apparatus for assembling EJB (Enterprise Java-Beans) components, comprising:
- a composite palette for browsing and managing the EJB components;
- an architecture diagram editor module for dragging and dropping the EJB components shown in the composite palette or using the component and connector icons in order to visually build an architecture for a composite component according to the C2 (chiron-2) style;
- a component property editor module for setting the properties of EJB components in an architecture, and describing a component specification which has information about interfaces and behaviors of each EJB component;
- a glue code and composite EJB generator module for automatically generating composite EJB component code and glue code;

wherein the component property editor module includes:
- a property editor module for setting and showing a name of the component and component context information describing hierarchy information of the component in the architecture, link information on a component specification file which specifies interfaces and behaviors of the component with an Architecture Description Language, link information on an EJB wrapper file which is used as a glue code for converting the EJB components to C2 components based on the component specification information, and EJB package (Jar) information of the component; and
- a specification editor module of the wizard type for being used to generate a specification file for describing interfaces and behaviors of the EJB components in the architecture; and wherein the glue code and composite EJB generator module includes: a glue code generator module for extracting the behavior information of the component from specification information built by an Architecture Description Language based on the C2 style and, then, automatically generating an EJB wrapper file that is used as a glue code for converting the EJB components to C2 components in the architecture based on the extracted behavior information; and
- a composite EJB generator module for defining a home/remote interface of a composite EJB, designating the name of a new file by using a composite EJB interface editor module, and then automatically generating the home/remote interface, a session bean file and a bean glue code file of the composite EJB.

11. The apparatus of claim 10, wherein the specification editor module generates the specification file for describing interfaces and behaviors of each component if 'Top'/'Bottom' interface, method and behavior information of each component are inputted by a wizard.

12. The apparatus of claim 10, wherein the glue code generator module automatically generates the EJB wrapper file that is used as the glue code for converting the EJB components to C2 components in the architecture using the interface and behavior information of the component made by the specification editor, wherein said EJB wrapper file has a Request/Notification message processing logic for each component and a home/remote interface searching logic according to an application server to be used.

13. The apparatus of claim 10, wherein the composite EJB generator module includes:
- a composite EJB interface editor module for generating the composite EJB for the whole architecture by providing a list of specification information on a bottom-most component of the architecture in order to define the home/remote interface of the composite EJB, and for allowing the user to specify the file name to be generated; and
- a composite EJB code generator module for creating the home/remote interface of the composite EJB, the session bean file, and a glue code file of a session bean for connecting the composite EJB to the architecture.

14. The apparatus of claim 10, wherein the composite palette browses and manages the EJB components (EJB packages) provided by a third party or in-house developed, architecture model files which are visually modeled, component specification files, and EJB wrapper files used as glue codes for converting the EJB components to C2 components, enabling the modeling of the architecture in the architecture diagram editor.

15. The apparatus of claim 10, wherein the architecture diagram editor module enables to assemble visually components into the architecture based on the C2 style by dragging-and-dropping the components selected from the composite palette, and check whether or not a syntax, a semantic and a topology of the architecture conform to the C2 style.

* * * * *